(12) United States Patent
Werneke et al.

(10) Patent No.: US 11,008,047 B2
(45) Date of Patent: May 18, 2021

(54) CONNECTING SLEEVE ARRANGEMENT FOR CONNECTING TUBULAR CROSS MEMBERS IN A VEHICLE

(71) Applicant: Benteler Automobiltechnik GmbH, Paderborn (DE)

(72) Inventors: Simon Werneke, Büren (DE); Konstantin Tatarinov, Bielefeld (DE)

(73) Assignee: Benteler Automobiltechnik GmbH, Paderborn (DE)

( * ) Notice: Subject to any disclaimer, the term of this patent is extended or adjusted under 35 U.S.C. 154(b) by 111 days.

(21) Appl. No.: 16/591,391

(22) Filed: Oct. 2, 2019

(65) Prior Publication Data

US 2020/0122778 A1 Apr. 23, 2020

(30) Foreign Application Priority Data

Oct. 19, 2018 (DE) .................... 10 2018 126 040.7

(51) Int. Cl.
*B60R 19/34* (2006.01)
*B62D 25/14* (2006.01)

(52) U.S. Cl.
CPC .................................. *B62D 25/145* (2013.01)

(58) Field of Classification Search
CPC ............... B29C 66/71; B29K 2007/00; B29K 2023/06; B29K 2033/08; B29K 2083/00; B65D 2571/00141; B65D 2571/0066; B65D 2571/00728; B65D 71/36; B22F 2998/00
See application file for complete search history.

(56) References Cited

U.S. PATENT DOCUMENTS

| 3,671,002 | A | * | 6/1972 | Elliott | ...................... | H02G 7/20 |
| | | | | | | 248/300 |
| 3,839,605 | A | * | 10/1974 | Morrell | .................... | H04M 1/23 |
| | | | | | | 379/369 |
| 4,757,653 | A | * | 7/1988 | Anderholm | ............. | E04F 11/00 |
| | | | | | | 52/182 |
| 5,292,009 | A | * | 3/1994 | Smith | ...................... | B62H 3/00 |
| | | | | | | 211/19 |

(Continued)

FOREIGN PATENT DOCUMENTS

DE 10 2008 045 914 A1 3/2010
EP 2 064 108 B1 6/2009

*Primary Examiner* — Kiran B Patel
(74) *Attorney, Agent, or Firm* — Holland & Hart LLP

(57) ABSTRACT

The present disclosure relates to a connecting sleeve arrangement for connecting a first tubular cross member to a second tubular cross member of an instrument panel support in a vehicle, including: a first receptacle opening configured to receive the first tubular cross member extending in a first cross member direction, and a second receptacle opening facing away from the first receptacle opening configured to receive the second tubular cross member extending in a second cross member direction, wherein the connecting sleeve arrangement is curved, wherein the second receptacle opening is transversely offset, relative to the first receptacle opening, from the first cross member direction, and wherein the connecting sleeve arrangement is formed from a first half shell and a second half shell that are integrally bonded to one another.

20 Claims, 5 Drawing Sheets

(56) References Cited

U.S. PATENT DOCUMENTS

| | | | | |
|---|---|---|---|---|
| 6,152,204 | A * | 11/2000 | Santoro | A47H 2/00 |
| | | | | 160/19 |
| 7,651,133 | B2 * | 1/2010 | Branning | B62D 21/14 |
| | | | | 280/785 |
| 8,998,261 | B2 * | 4/2015 | Downie | B25J 18/00 |
| | | | | 280/801.2 |
| 9,151,098 | B2 * | 10/2015 | Yamada | B60J 5/047 |
| 9,321,417 | B1 * | 4/2016 | Lepper | B60R 21/201 |
| 9,601,908 | B2 * | 3/2017 | Merritt | H02G 3/045 |
| 10,914,448 | B2 * | 2/2021 | Marchlewski | B60Q 1/2649 |
| 2006/0113821 | A1 * | 6/2006 | Yokomori | B60J 5/06 |
| | | | | 296/155 |
| 2014/0152051 | A1 * | 6/2014 | Saitou | B62D 25/08 |
| | | | | 296/187.09 |
| 2014/0319880 | A1 * | 10/2014 | Shigihara | B62D 21/03 |
| | | | | 296/193.09 |
| 2017/0158263 | A1 * | 6/2017 | Kojo | B62D 43/10 |
| 2018/0297642 | A1 * | 10/2018 | Kudoh | B62D 25/087 |
| 2019/0084396 | A1 * | 3/2019 | Suzuki | B62D 21/152 |
| 2020/0189491 | A1 * | 6/2020 | Marchlewski | F16B 5/065 |
| 2020/0217478 | A1 * | 7/2020 | Marchlewski | B60Q 1/2638 |
| 2020/0262485 | A1 * | 8/2020 | Hida | B62D 27/02 |

* cited by examiner

CONNECTING SLEEVE ARRANGEMENT FOR CONNECTING TUBULAR CROSS MEMBERS IN A VEHICLE

CROSS-REFERENCE TO RELATED APPLICATIONS

This application claims priority to German patent application No. 10 2018 126 040.7, entitled "Verbindungshülsenanordnung zum Verbinden von rohrförmigen Querträgern in einem Fahrzeug", and filed on Oct. 19, 2018 by the Applicant of this application. The entire disclosure of the German application is incorporated herein by reference for all purposes.

BACKGROUND

The present disclosure relates to a connecting sleeve arrangement for connecting tubular cross members in a vehicle, in particular, a connecting sleeve arrangement for connecting a first tubular cross member to a second tubular cross member of an instrument panel support in a vehicle.

Cross member arrangements are installed in vehicles and are configured as instrument panel supports arranged in the cockpit of the vehicle. Corresponding cross member arrangements or instrument panel supports are attached between body components, such as A-posts, in the vehicle. Due to the restricted installation space available in the cockpit of the vehicle, corresponding cross member arrangements often have bends, which are compensated for by connecting elements.

In DE 10 2008 045 914 A1, a connecting element is disclosed for connecting a first tube to a second tube in a tube arrangement.

EP 2 064 108 B1 discloses a support tube of an instrument panel of a motor vehicle.

SUMMARY

It is an object of the present disclosure to provide a stable and advantageously mountable connecting element in a cross member arrangement.

This object is achieved by means of the features of the independent claims. Advantageous examples of the disclosure are the subject matter of the dependent claims, the description, and the drawings.

The present disclosure is based on the finding that a connecting element which is configured as a curved connecting sleeve arrangement allows an advantageous transverse offset between two cross members included in the connecting sleeve arrangement, while ensuring, in particular, a small bending radius of the curved connecting sleeve arrangement.

Furthermore, the present disclosure is based on the fact that a curved connecting sleeve arrangement made from two integrally bonded half shells enables smaller shape tolerances and ensures that the curved connecting sleeve arrangement has sufficient stability in the event that the vehicle is in a collision.

According to a first aspect, the disclosure relates to a connecting sleeve arrangement for connecting a first tubular cross member to a second tubular cross member of an instrument panel support in a vehicle, having a first receptacle opening for receiving the first tubular cross member extending in a first cross member direction, a second receptacle opening facing away from the first receptacle opening for receiving the second tubular cross member extending in a second cross member direction, wherein the connecting sleeve arrangement is formed as a curved connecting sleeve arrangement, and wherein the second receptacle opening is arranged offset, relative to the first receptacle opening, transversely to the first cross member direction, and wherein the connecting sleeve arrangement is formed from a first half shell and a second half shell which are integrally bonded to one another.

This achieves the technical advantage that a particularly robust curved connecting sleeve arrangement may be provided to enable small bending radii.

Advantageous, in particular, small, bending radii corresponding to the requirement profile may be obtained through the transverse offset of the second receptacle opening relative to the first receptacle opening within the curved connecting sleeve arrangement.

In particular, the curved connecting sleeve arrangement is formed to receive the first and second cross members spaced apart from one another in the connecting sleeve arrangement.

In particular, the curved connecting sleeve arrangement may be formed as a single-curve connecting sleeve arrangement, wherein the directions of the first and second cross members receivable in the respective receptacle openings may extend at an angle to one another.

In particular, the curved connecting sleeve arrangement may be embodied as a double-curve, in particular, S-shaped, connecting sleeve arrangement, wherein the directions of the first and second cross member which are receivable in the respective receptacle openings extend parallel to one another, in particular, parallel to one another.

In particular, the curved connecting sleeve arrangement and the first and second cross members receivable in the curved connecting sleeve arrangement lie in one plane.

In particular, the curved connecting sleeve arrangement and one of the first or second cross members receivable in the curved connecting sleeve arrangement lie in one plane, while the other of the first or second cross members receivable in the curved connecting sleeve arrangement extends at an angle to said plane.

By forming the curved connecting sleeve arrangement from two half shells, advantageous mechanical properties of the curved connecting sleeve arrangement may be set by selecting the shape and the material of the half shells.

In this case, the half shells may be formed in particular from the same or different materials, in particular, from steel. In this case, the half shells may have the same wall thickness or different wall thicknesses. An effective, stable connection of the curved connecting sleeve arrangement may be ensured through the integrally bonded connection between the half shells.

In particular, the first and second half shells extend in a longitudinal direction of the connecting sleeve arrangement.

In one example, the connecting sleeve arrangement comprises a first, at least partially curved, first sleeve region, in which the first receptacle opening is formed, while the connecting sleeve arrangement comprises a second, at least partially curved, second sleeve region in which the second receptacle opening is formed, wherein the first curved sleeve region is connected to the second, at least partially curved, sleeve region by a straight sleeve region, wherein, in particular, the first and second curved sleeve regions are curved in different curvature directions relative to the straight sleeve region.

This achieves the technical advantage that a favourable setting of the curvature may be ensured by the first and second, at least partially curved, sleeve regions, which are connected to the straight sleeve region. The at least partially curved first and/or second sleeve regions may, in particular, each comprise a curved region and a straight region. In particular, the length of the respective straight regions corresponds to the insertion depth of the respective cross member. In particular, the length of the respective straight region is between 3 mm and 10 mm.

If the first and second curved sleeve regions are curved, in particular in respective different curvature directions relative to the straight sleeve region, then an advantageous transverse offset of the second receptacle opening relative to the first receptacle opening may be ensured. In particular, the amount of the curvature of the first and second, at least partially curved, sleeve regions is the same, wherein, in particular, the first and second cross member directions of the first and second cross members receivable in the connecting sleeve arrangement extend adjacent to one another, in particular, parallel to one another.

In another example, the straight sleeve region extends in an extent axis, wherein the extent axis encloses with the first cross member direction, a first curvature angle, wherein the extent axis encloses with the second cross member direction, a second curvature angle, wherein, in particular, the first and second curvature angles may be of equal or different size.

This achieves the technical advantage that the curvature angles based on the curved path of the respective, at least partially curved, sleeve regions ensure an advantageous transverse offset within the curved connecting sleeve arrangement. If the first and second curvature angles are, in particular, of equal size, then the first and second cross member directions extend adjacent to one another, in particular, parallel to one another. If the first and second curvature angles are, in particular, of different size, the first and second cross member directions extend at an angle to one another.

In another example, the connecting sleeve arrangement, in particular, the first curved sleeve region, comprises a first receptacle portion, which extends from the first receptacle opening and is configured to receive the first tubular cross member, wherein the connecting sleeve arrangement, in particular the second curved sleeve region, comprises a second receptacle section which extends from the second receptacle opening and is configured to receive the second tubular cross member.

This achieves the technical advantage that the respective receptacle portion ensures effective receiving of the cross member introduced through the respective receptacle opening into the connecting sleeve arrangement. In particular, the first tubular cross member, which may be received in the first receptacle opening, may be connected to the connecting sleeve arrangement through integrally bonding, in particular, welding. In particular, the second tubular cross member, which may be received in the second receptacle opening may be connected, in particular, welded to the connecting sleeve arrangement.

In particular, the first and/or second receptacle portion is configured as a straight region of the first and/or second curved sleeve region. In particular, the length of the respective receptacle portion corresponds to the insertion depth of the respective cross member end. In particular, the length of the respective receptacle portion is between 3 mm and 10 mm.

In one example, the first and/or second receptacle portion each has a stop, in order to limit an introduction movement of the respective tubular cross member which may be received in the respective receptacle portion.

This achieves the technical advantage that the respective stop ensures effective positioning of the respective cross member in the connecting sleeve arrangement.

In another example, an upper side of the connecting sleeve arrangement is formed by the first half shell, while an underside of the connecting sleeve arrangement is formed by the second half shell.

This achieves the technical advantage of obtaining a stable connecting sleeve arrangement.

In another example, the first and second half shells each extend in a longitudinal direction of the connecting sleeve arrangement, wherein the first and second half shells each extend, in particular, in the first, at least partially curved, sleeve region, the straight sleeve region and the second, at least partially curved, sleeve region.

This achieves the technical advantage that the two half shells provide an advantageous curvature of the curved connecting sleeve arrangement.

In another example, the first and second half shells may have the same wall thickness or different wall thicknesses, and/or the first and second half shells may be formed from the same or different materials.

This achieves the technical advantage that advantageous stability properties of the connecting sleeve arrangement may be provided by the adjustment of the wall thicknesses and/or by the selection of the materials.

In another example, the first receptacle opening has a first inner diameter, while the second receptacle opening has a second inner diameter, wherein the first and second inner diameters are of equal or different size for receiving tubular cross members with outer diameters of the same or different sizes.

This achieves the technical advantage that an advantageous adaptation of the inner diameter of the connecting sleeve arrangement to match the outer diameter of the tubular cross member may be affected.

In another example, the connecting sleeve arrangement comprises a first support element, which is arranged, in particular, on the second, at least partially curved, sleeve region, and wherein the first support element may be fastened to the bodywork, in particular, the floor of the vehicle, and wherein the connecting sleeve arrangement, in particular, the second curved sleeve region, comprises first fastening openings for fastening the first support element to the connecting sleeve arrangement, in particular to the second, at least partially curved, sleeve region.

This achieves the technical advantage that the first support element is supported on the bodywork, in particular on the floor of the vehicle, in order to ensure an effective stabilisation of the connecting sleeve arrangement and thus of the cross member arrangement. In particular, the first support element is connected to the second, at least partially curved, sleeve region in an integrally bonded, form-fitting, and/or frictionally connected manner.

In another example, the first support element is configured as a one-piece brace which extends from the connecting sleeve arrangement to the bodywork.

This achieves the technical advantage of ensuring effective support of the connecting sleeve arrangement.

In another example, the connecting sleeve arrangement comprises a second support element which is arranged, in particular, on the straight sleeve region, and wherein the second support element may be fastened to the bodywork of the vehicle, or wherein an instrument may be fastened to the second support element, and wherein the connecting sleeve arrangement, in particular, the straight sleeve region, comprises second fastening openings for fastening the second support element to the connecting sleeve arrangement, in particular, to the straight sleeve region.

This achieves the technical advantage of ensuring effective stabilisation of the connecting sleeve arrangement and thus of the cross member arrangement by the second support element attached to the bodywork. In particular, the second support element is connected to the straight sleeve region in an integrally bonded, form-fitting, and/or frictionally connected manner.

In another example, the second support element comprises a first fastening region fastened to the connecting sleeve arrangement, in particular, to the straight sleeve region, in particular in an integrally bonded, form-fitting, and/or frictionally connected manner, wherein the second support element comprises a second fastening region for fastening the second support element to the bodywork of the vehicle, wherein the second fastening region is arranged, in particular, at an angle to the first fastening region.

This achieves the technical advantage of ensuring effective stabilisation of the connecting sleeve arrangement or the cross member arrangement. In particular, the second fastening region of the second support element extending at angle to the first fastening area is configured as a fork-shaped second fastening region.

In another example, the connecting sleeve arrangement comprises a third support element, which is arranged, in particular, on the first, at least partially curved, sleeve region, wherein the third support element may be fastened to the instrument panel of the vehicle, and wherein the connecting sleeve arrangement, in particular the first curved sleeve region, has third fastening openings for fastening the third support element to the connecting sleeve arrangement, in particular to the first, at least partially curved, sleeve region.

This achieves the technical advantage that the instrument panel may be advantageously connected to the connecting sleeve arrangement. In particular, the third support element is connected in an integrally bonded, form-fitting and/or frictionally connected manner to the first, at least partially curved, sleeve region.

In another example, the third support element comprises a first fastening portion which is fastened to the connecting sleeve arrangement, in particular, to the first, at least partially curved, sleeve region, in particular in an integrally bonded, form-fitting, and/or frictionally connected manner, wherein the third support element comprises a second fastening portion for fastening the third support element to the instrument panel of the vehicle, wherein the third support element comprises a connecting portion for connecting the first fastening portion and the second fastening portion, wherein the second fastening portion, the connecting portion and the first fastening portion, may be arranged, in particular, at an angle to one another.

This achieves the technical advantage that advantageous fastening of an instrument panel to the cross member arrangement is ensured through the design of the third support element.

In another example, the second receptacle opening is arranged opposite the first receptacle opening offset transversely to the first cross member direction, wherein the transverse offset is greater than a first outer diameter of the first tubular cross member and/or the transverse offset is greater than a second outer diameter of the second tubular cross member.

This achieves the technical advantage that an advantageous connecting sleeve arrangement may be provided.

In another example, the first half shell is firmed at least partially arc-shaped in cross-section and comprises two longitudinal edges, while the second half shell is formed at least partially arc-shaped in cross-section and comprises two longitudinal edges, wherein, in particular, the half shells at least partially overlap with their longitudinal edges directed toward one another.

This achieves the technical advantage that a particularly stably formed connecting sleeve arrangement may be provided.

In another example, at least one of the half shells has a step-shaped form in cross-section between a longitudinal edge and the portion that is arc-shaped in cross-section.

This achieves the technical advantage that effective stabilisation of the connecting sleeve arrangement may be provided.

According to a second aspect, the disclosure relates to a cross member arrangement of an instrument panel support having a connecting sleeve arrangement according to the first aspect, a first tubular cross member and a second tubular cross member, wherein the first tubular cross member is received in the first receptacle opening of the connecting sleeve arrangement and is connected to the connecting sleeve arrangement, and wherein the second tubular cross member is received in the second receptacle opening of the connecting sleeve arrangement and is connected to the connecting sleeve arrangement.

This achieves the technical advantage of ensuring an effective and stable connection between the two tubular cross members within the cross member arrangement by means of the connecting sleeve arrangement.

In another example, the first and second tubular cross members are arranged spaced apart from one another within the connecting sleeve arrangement.

This achieves the technical advantage that tolerance compensation is possible when positioning the cross member in the connecting sleeve arrangement.

In another example, the first tubular cross member received in the first receptacle opening and the second tubular cross member received in the second receptacle opening, are each integrally bonded, in particular welded, to an inner wall of the connecting sleeve arrangement.

This achieves the technical advantage of ensuring a stable cross member arrangement.

In another example, the first tubular cross member has a different wall thickness and/or a different tensile strength and/or a different outer circumference relative to the second tubular cross member, wherein, in particular, the wall thickness, the tensile strength and/or the outer circumference of the first tubular cross member is greater than the wall thickness, the tensile strength and/or the outer circumference of the second tubular cross member.

This achieves the technical advantage of ensuring a stable cross member arrangement with different cross members.

The examples disclosed in relation to the first aspect are also considered examples for the subject matter according to the second aspect.

BRIEF DESCRIPTION OF THE DRAWINGS

Further examples of the present disclosure are described with reference to the accompanying drawings.

DETAILED DESCRIPTION

Figure 1:
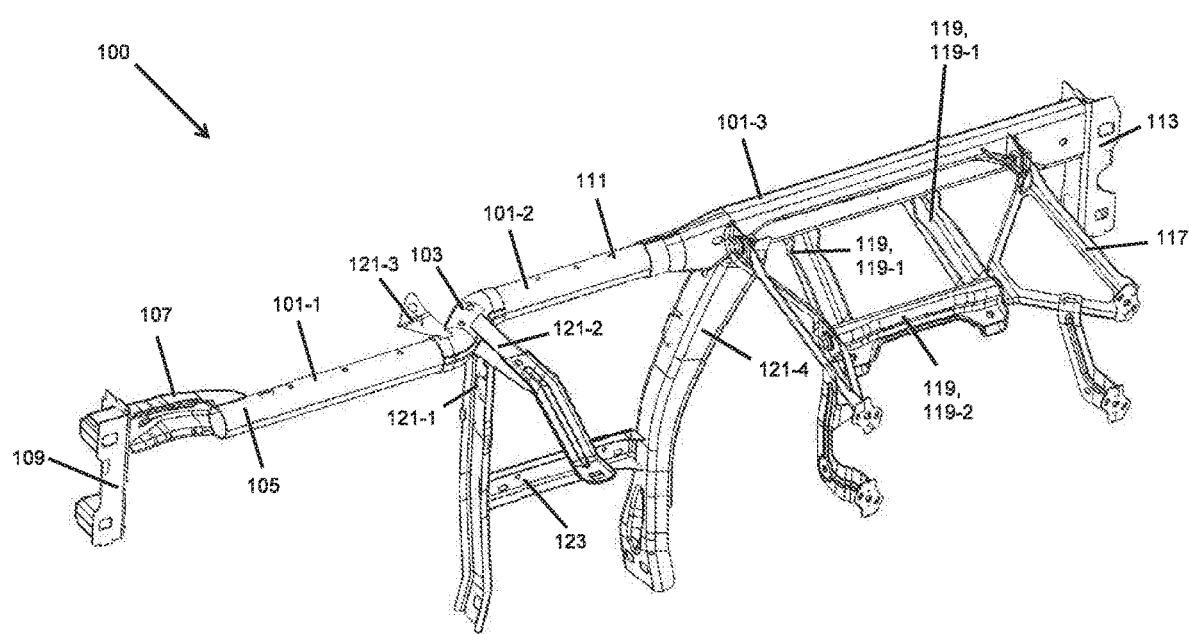
FIG. 1 shows a perspective view of a cross member arrangement for a vehicle according to one example.

FIG. 1 shows a perspective view of a cross member arrangement for a vehicle according to another example.

Cross member arrangements are installed in vehicles and are configured in particular as instrument panel supports arranged in the cockpit of the vehicle. Corresponding cross member arrangements or instrument panel supports may be attached between body components, such as A-posts, of the vehicle. Corresponding cross member arrangements, or instrument panel supports, not only support the instrument panel arranged on a dashboard, but also serve to mount a steering column, possibly existing airbag modules, or any existing air conditioning system of the vehicle. A further function of the cross member arrangements is the absorbing and transmitting of side impact forces.

Due to the installation space available in the cockpit of the vehicle, cross member arrangements have bends, the design of which is determined, for example, by the bending radius and the material used.

The cross member arrangement 100, in particular the instrument panel support, according to the example shown in FIG. 1, comprises a first tubular cross member 101-1 and a second tubular cross member 101-2, which are connected to one another by a connecting sleeve arrangement 103.

A first cross member end 105 of the first cross member 101-1 is connected by a connecting element 107 to a fastening element 109, wherein the fastening element 109 is configured to fasten the cross member arrangement 100 to a bodywork component (not shown in FIG. 1), in particular, the first A-post, of the vehicle.

A second cross member end 111 of the second cross member 101-2 is connected in this example by a third cross member 101-3 to a further fastening element 113, wherein the further fastening element 113 is configured to fasten the cross member arrangement 100 to a further bodywork component (not shown in FIG. 1), in particular, to an A-post situated opposite the first A-post of the vehicle. The further fastening element 113 may also be an integral component of the cross member end 111 of the second cross member 101-2, for example, in the form of one or more passage openings. The second cross member 101-2 may also be configured as a single piece throughout as far as the further fastening element 113, or as a so-called "Tailored Welded Blank", so that a connection with a third cross member 101-3 is not needed.

A bodywork mounting element 117 is arranged on the third cross member 101-3 for fastening the cross member arrangement 100 to a bodywork of the vehicle.

A steering mount 119 for holding a steering column of the vehicle (not shown in FIG. 1) is additionally arranged on the third cross member 101-3, wherein the steering mount 119 is connected, in particular, to the bodywork fastening element 117.

The steering mount 119 shown in FIG. 1 is configured, in particular, as an upwardly open steering mount 119, with a U-profiled cross-section, and comprises two longitudinal braces 119-1, which are connected by means of a lateral brace 119-2. A threaded element and a steering column (not shown in FIG. 1) may be fastened to the steering mount 119. In particular, the two longitudinal braces 119-1 are configured as upwardly open U-profiles and are connected by a downwardly open cross-brace 119-2 with a U-profiled cross-section, wherein threaded elements for fastening the steering column are arranged, in particular, in the overlapping region of the braces 119-1, 119-2.

A first support element 121-1, in particular a tunnel support which is attached to the floor of the vehicle is arranged on the connecting sleeve arrangement 103. A second support element 121-2 which is attached to the bodywork of the vehicle is arranged on the connecting sleeve arrangement 103. A third support element 121-3 to which an instrument panel of the vehicle is fastened, is arranged on the connecting sleeve arrangement 103.

A further support element 121-4, in particular a tunnel support, is arranged on the third cross member 101-3, wherein the further support element 121-4 is attached to the floor of the vehicle.

The further support element 121-4 attached to the third cross member 101-3 is connected to the first support element 121-1 fastened to the connecting sleeve arrangement 103 by means of transverse braces 123.

Figure 2:
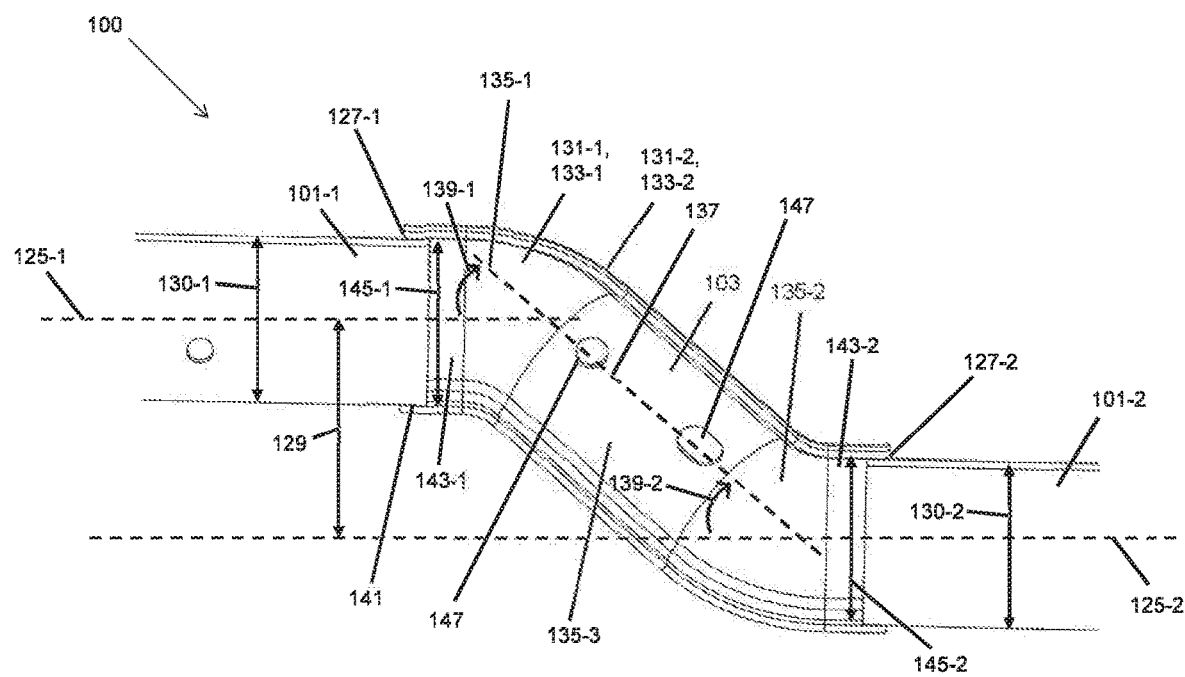
FIG. 2 shows a perspective view of a connecting sleeve arrangement of a cross member arrangement for a vehicle according to another example.

FIG. 2 shows a perspective view of a connecting sleeve arrangement of a cross member arrangement for a vehicle according to one example.

The connecting sleeve arrangement 103 of the cross member arrangement 100 is configured to connect a first tubular cross member 101-1 to a second tubular cross member 101-2. In this case, the first tubular cross member 101-1 extends in a first cross member direction 125-1, while the second tubular cross member 101-2 extends in a second cross member direction 125-2.

The connecting sleeve arrangement 103 comprises a first receptacle opening 127-1 to receive the first cross member 101-1 and comprises a second receptacle opening 127-2 facing away from the first receptacle opening 127-1 to receive the second cross member 101-2.

As shown in FIG. 2, the connecting sleeve arrangement 103 is formed as a curved connecting sleeve arrangement 103. In this case, the second receptacle opening 127-2 is arranged relative to the first receptacle opening 127-1 offset transversely to the first cross member direction 125-1, wherein the second receptacle opening 127-2 is, in particular, arranged relative to the first receptacle opening 127-1 offset by a transverse offset 129 transversely to the first cross member direction 125-1.

In particular, the transverse offset 129 is greater than a first outer diameter 130-1 of the first tubular cross member 101-1 and/or the transverse offset 129 is greater than a second outer diameter 130-2 of the second tubular cross member 100-2.

The connecting sleeve arrangement 103 is formed from a first half shell 131-1 and a second half shell 131-2, which are integrally bonded to one another. An upper side 133-1 of the connecting sleeve arrangement 103 is here configured, in particular, as the first half shell 131-1 and an underside 133-2 (shown only schematically in FIG. 2) of the connecting sleeve arrangement 103 is here configured, in particular, as the second half shell 131-2.

In particular, the first and second half shells 131-1, 131-2 have the same wall thickness or different wall thicknesses, and/or the first and second half shells 131-1, 131-2 are formed from the same or different materials.

In particular, the connecting sleeve arrangement 103 comprises a first, at least partially curved, sleeve region 135-1, in which the first receptacle opening 127-1 is formed, a second, at least partially curved, sleeve region 135-2, in which the second receptacle opening 127-2 is formed, and a straight sleeve section 135-3, which connects the first, at least partially curved, sleeve region 135-1 to the second, at least partially curved, sleeve region 135-2.

The at least partially curved first and second sleeve regions 135-1, 135-2 here have a curved region and a straight region in the region of the respective receptacle opening 127-1, 127-2. In particular, the length of the respective straight region corresponds to the insertion depth of the respective cross member end. In particular, the length of the respective straight region is between 3 mm and 10 mm.

In particular, the first and second curved sleeve sections 135-1, 135-2 are curved in different curvature directions relative to the straight sleeve region 135-3. In particular, a first curvature of the first, at least partially curved, sleeve region 135-1 and a second curvature of the second, at least partially curved, sleeve section 135-2, and that are curved in different curvature directions, are identical, so that the first tubular cross member 101-1 and the second tubular cross member 101-2 extend adjacent to one another, in particular, parallel to one another, and are offset from one another by the transverse offset 129.

In particular, the straight sleeve region 135-3 extends in an extent axis 137, wherein the extent axis 137 encloses with the first cross member axis 125-1 of the first cross member 101-1 received in the first, at least partially curved, sleeve region 135-1, a first curvature angle 139-1, and wherein the extent axis 137 encloses with the second cross member axis 125-2 of the second cross member 101-2 received in the second, at least partially curved, sleeve region 135-2, a second curvature angle 139-2.

In this case, the first and second curvature angles 139-1, 139-2 are, in particular, of equal or different size.

The first cross member 101-1 received in the first receptacle opening 127-1 and the second cross member 101-2 received in the second receptacle opening 127-2 are integrally bonded, in particular welded, to the connecting sleeve arrangement 103. In particular, the first and second cross members 101-1, 101-2 are integrally bonded, in particular, welded to an inner wall 141 of the connecting sleeve arrangement 103.

In particular, the connecting sleeve arrangement 103, in particular the first curved sleeve region 135-1, comprises a first receptacle portion 143-1, which extends from the first receptacle opening 127-1 and is configured to receive the first tubular cross member 101-1.

In particular, the connecting sleeve arrangement 103, in particular the second curved sleeve region 135-2, comprises a second receptacle portion 143-2, which extends from the second receptacle opening 127-2 and is configured to receive the second tubular cross member 101-2.

In particular, the first and second receptacle portion 143-1, 143-2 is configured as a straight region of the first and second curved sleeve regions 135-1, 135-2. In particular, the length of the respective receptacle portions 143-1, 143-2 corresponds to the insertion depth of the respective cross member end. In particular, the length of the respective receptacle portions 143-1, 143-2 is between 3 mm and 10 mm.

In this case, the first and/or second receptacle portions 143-1, 143-2 comprise, in particular, a stop not shown in FIG. 2 in order to limit an insertion movement of the respective tubular cross member 101-1, 101-2.

In particular, the first and second tubular cross members 101-1, 101-2 are arranged within the connecting sleeve arrangement 103 spaced apart from one another.

The first receptacle opening 127-1 has a first inner diameter 145-1, while the second receptacle opening 127-2 has a second inner diameter 145-2, wherein the first and second inner diameters 145-1, 145-2 are of the same or different size, in order to receive tubular cross members 101-1, 101-2, with the same or different outer diameters 130-1, 130-2.

In particular, the connecting sleeve arrangement 103 comprises a plurality of fastening openings 147 for fastening support elements of the connecting sleeve arrangement 103 (not shown in FIG. 2).

Figure 3:
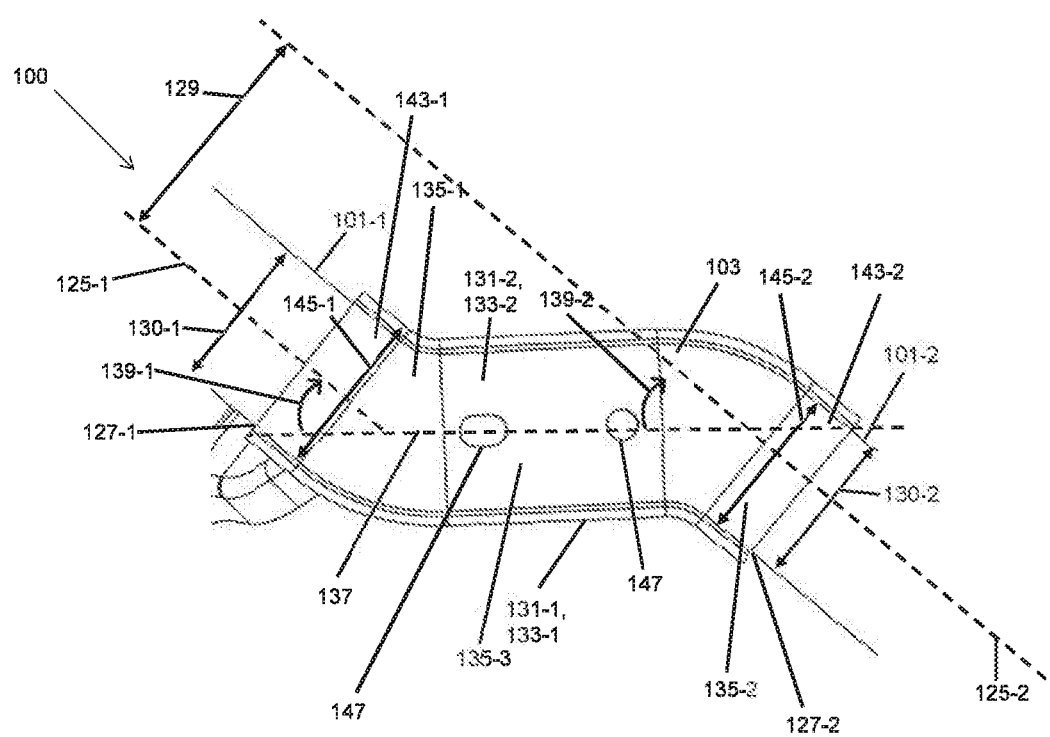
FIG. 3 shows a further perspective view of a connecting sleeve arrangement of a cross member arrangement for a vehicle according to the example shown in FIG. 2.

FIG. 3 shows a further perspective view of a connecting sleeve arrangement of a cross member arrangement for a vehicle according to the example shown in FIG. 2. For further details regarding this, reference is made to the statements in relation to FIG. 2.

Figure 4:
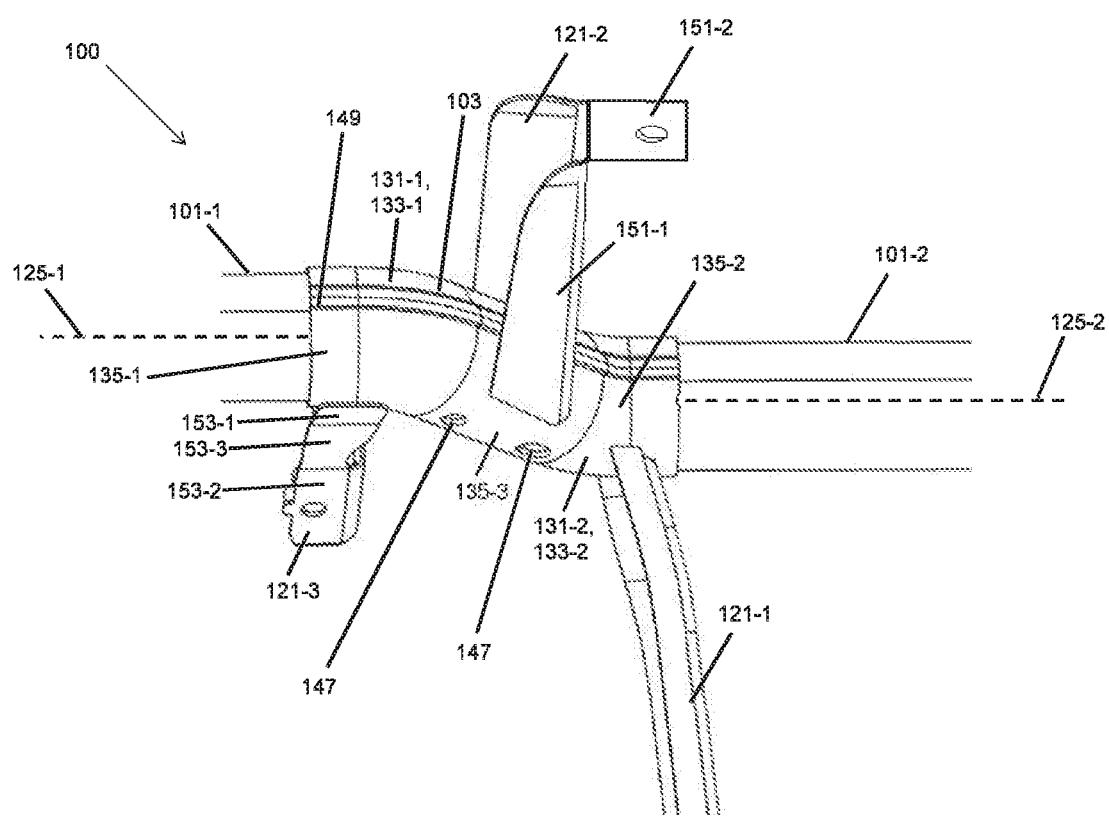
FIG. 4 shows a perspective view of a connecting sleeve arrangement of a cross member arrangement according to a further example.

FIG. 4 shows a perspective view of a connecting sleeve arrangement of a cross member arrangement for a vehicle according to a further example.

The curved connecting sleeve arrangement 103 shown in FIG. 4 is formed from a first half shell 131-1 and a second half shell 131-2, which are integrally bonded to one another. An upper side 133-1 of the connecting sleeve arrangement 103 is here configured, in particular, as the first half shell 131-1, while an underside 133-2 of the connecting sleeve arrangement 103 is here configured, in particular, as the second half shell 131-2. As shown in FIG. 3, the first and second half shells 131-1, 131-2 extend in a longitudinal direction of the curved connecting sleeve arrangement 103, while a half shell connection 149 is formed between the first and second half shells 131-1, 131-2. The half shell connection is configured, in particular, as a weld seam, preferably as a stitch seam weld.

In particular, the first and second half shells 131-1, 131-2 have the same wall thickness or different wall thicknesses, and/or the first and second half shells 131-1, 131-2 are formed from the same or different materials.

The connecting sleeve arrangement 103 comprises a first, at least partially curved, sleeve region 135-1, a second, at least partially curved, sleeve region 135-2, and a straight sleeve region 135-3. For further details in this regard, reference is made to the statements relating to FIGS. 2 and 3.

The connecting sleeve arrangement 103 comprises a first support element 121-1 which is arranged, in particular, on the second, at least partially curved, sleeve region 135-2. The first support element 121-1 may be fastened to a chassis, in particular, on the floor of the vehicle. In this case, the first support element 121-1 is configured, in particular, as a one-piece brace which extends from the connecting sleeve arrangement 103 to the bodywork (not shown in FIG. 4).

The connecting sleeve arrangement 103 comprises a second support element 121-2 which is arranged, in particular, on the straight sleeve region 135-3. The second support element 121-2 may be fastened to a chassis of the vehicle. In this case, the connecting sleeve arrangement 103 comprises, in particular, the straight sleeve region 135-3, fastening openings 147 for fastening the second support element 121-2 on the connecting sleeve arrangement 103, in particular, on the straight sleeve region 135-3.

The second support element 121-2 comprises a first fastening region 151-1 which is fastened on the connecting sleeve arrangement 103, in particular, on the straight sleeve region 135-3, in particular, in an integrally bonded, form-fitting, and/or frictionally connected manner. The second support element 121-2 comprises a second fastening region 151-2 for fastening the second support element 121-2 to the bodywork of the vehicle, wherein the second fastening region 151-2 is arranged, in particular, at an angle to the first fastening region 151-1.

The connecting sleeve arrangement 103 comprises a third support element 121-3 which is arranged, in particular, on the first, at least partially curved, sleeve region 135-1. The third support element 121-3 may be fastened to an instrument panel of the vehicle.

The third support element 121-3 comprises a first fastening portion 153-1 which is fastened on the connecting sleeve arrangement 103, in particular, on the first, at least partially curved, sleeve region 135-1, in particular, in an integrally bonded, form-fitting, and/or frictionally connected manner. The third support element 121-3 comprises a second fastening portion 153-2 for fastening the third support element 121-3 to the instrument panel of the vehicle. The third support element 121-3 comprises a connecting portion 153-3 for connecting the first fastening portion 153-1 and the second fastening portion 153-2, wherein the second fastening portion 153-2, the connecting portion 153-3 and the first fastening portion 153-1 are arranged, in particular, at an angle to one another.

Effective stabilisation of the cross member arrangement 100 on the body of the vehicle may be ensured by means of the first, second, and third support elements 121-1, 121-2, 121-3.

Figure 5:
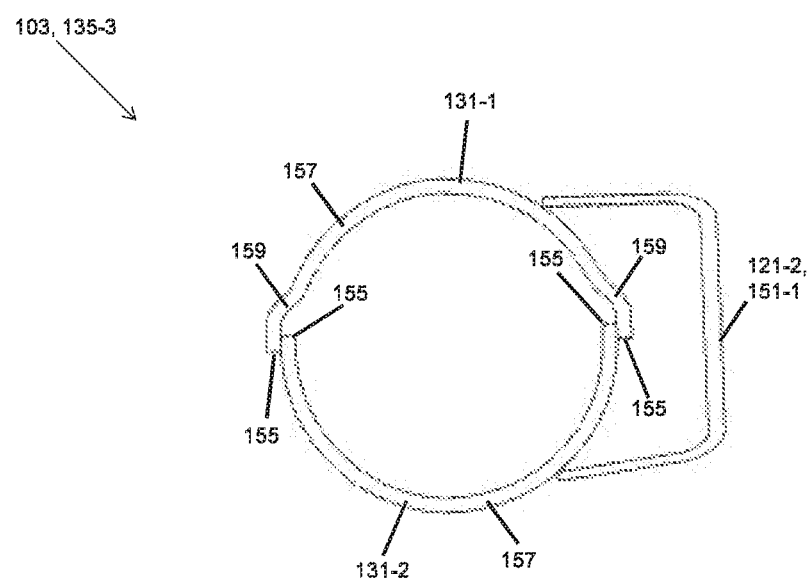
FIG. 5 shows a schematic representation of a cross-section of a connecting sleeve arrangement in the region of a support element.

FIG. 5 shows a schematic representation of a cross-section of a connecting sleeve arrangement in the region of a support element.

In particular, FIG. 5 shows a cross-section of a straight sleeve region 135-3 of the connecting sleeve arrangement 103.

The connecting sleeve arrangement 103 is formed from a first half shell 131-1 and a second half shell 131-2, which are integrally bonded to one another.

As shown in FIG. 5, the first and second half shells 131-1, 131-2 are each formed at least partially arc-shaped in cross-section and each comprises two longitudinal edges 155. In particular, the two longitudinal edges 155 of the first half shell 131-1 overlap with the two longitudinal edges 155 of the second half shell 131-2.

In particular, a step-shaped formation 159 is provided between a longitudinal edge 155 and the portion 157 of the respective half shell 131-1, 131-2 that is arc-shaped in cross-section.

As further shown in FIG. 5, a second support element 121-2, in particular, a first fastening region 151-1 of the second support element 121-2 is fastened on the connecting sleeve arrangement 103, in particular, on the straight sleeve portion 135-3 of the connecting sleeve arrangement 103.

LIST OF REFERENCE NUMBERS

100 Cross member arrangement
101-1 First tubular cross member
101-2 Second tubular cross member
101-3 Third tubular cross member
103 Connecting sleeve arrangement
105 First cross member end of first tubular cross member
107 Connecting element
109 Fastening element
111 Second cross member end of second cross member
113 Further fastening element
117 Bodywork fastening element
119 Steering mount
119-1 Longitudinal braces of steering mount
119-2 Cross-braces of steering mount
121-1 First support element
121-2 Second support element
121-3 Third support element
121-4 Further support element
123 Cross-braces
125-1 First cross member direction
125-2 Second cross member direction
127-1 First receptacle opening
127-2 Second receptacle opening
129 Transverse offset
130-1 First outer diameter of first tubular cross member
130-2 Second outer diameter of second tubular cross member
131-1 First half shell
131-2 Second half shell
133-1 Upper side of connecting sleeve arrangement
133-2 Underside of connecting sleeve arrangement
135-1 First curved sleeve region
135-2 Second curved sleeve region
135-3 Straight sleeve region
137 Extent axis
139-1 First curvature angle
139-2 Second curvature angle
141 Inner wall
143-1 First receptacle portion
143-2 Second receptacle portion
145-1 First inner diameter
145-2 Second inner diameter
147 Fastening opening
149 Half shell connection
151-1 First fastening region of second support element
151-2 Second fastening region of second support element
153-1 First fastening portion of third support element
153-2 Second fastening portion of third support element
153-3 Connecting portion of third support element
155 Longitudinal edges of half shell
157 Arc-shaped cross-section portion of respective half shell
159 Step-shaped formation

What is claimed is:

1. A connecting sleeve arrangement for connecting a first tubular cross member to a second tubular cross member of an instrument panel support in a vehicle, comprising:
   a first receptacle opening configured to receive the first tubular cross member extending in a first cross member direction; and
   a second receptacle opening facing away from the first receptacle opening and configured to receive the second tubular cross member extending in a second cross member direction;
   wherein the connecting sleeve arrangement is curved, wherein the second receptacle opening is transversely offset, relative to the first receptacle opening, from the first cross member direction, and wherein the connecting sleeve arrangement is formed from a first half shell and a second half shell that are integrally bonded to one another.

2. The connecting sleeve arrangement according to claim 1, wherein the connecting sleeve arrangement comprises:
   a first, at least partially curved, sleeve region, in which the first receptacle opening is formed; and
   a second, at least partially curved, sleeve region in which the second receptacle opening is formed, wherein the first sleeve region is connected to the second sleeve region by a straight sleeve region, and wherein the first and the second sleeve regions are curved relative to the straight sleeve region in different curvature directions.

3. The connecting sleeve arrangement according to claim 2, wherein the straight sleeve region extends along an extent axis, wherein the extent axis encloses, with the first cross member direction, a first curvature angle, wherein the extent axis encloses, with the second cross member direction, a second curvature angle, and wherein the first and the second curvature angles are of equal size.

4. The connecting sleeve arrangement according to claim 2, wherein the first sleeve region comprises a first receptacle portion which extends from the first receptacle opening and is configured to receive the first tubular cross member, and wherein the second sleeve region comprises a second receptacle section which extends from the second receptacle opening and is configured to receive the second tubular cross member.

5. The connecting sleeve arrangement according to claim 1, wherein an upper side of the connecting sleeve arrangement is formed by the first half shell, and wherein an underside of the connecting sleeve arrangement is formed by the second half shell.

6. The connecting sleeve arrangement according to claim 2, wherein the first and the second half shells each extend in a longitudinal direction of the connecting sleeve arrangement, and wherein the first and the second half shells each extend, in the first sleeve region, the straight sleeve region, and the second sleeve region.

7. The connecting sleeve arrangement according to claim 1, wherein the first receptacle opening comprises a first inner diameter, wherein the second receptacle opening comprises a second inner diameter, wherein the first and the second inner diameters are of equal or different sizes to receive tubular cross members with outer diameters of the same or different sizes, respectively.

8. The connecting sleeve arrangement according to claim 2, further comprising:
a first support element arranged on the second sleeve region, and wherein the first support element is fastened to a bodywork of the vehicle.

9. The connecting sleeve arrangement according to claim 8, wherein the first support element comprises a single-piece brace that extends from the connecting sleeve arrangement to the bodywork.

10. The connecting sleeve arrangement according to claim 2, further comprising:
a second support element arranged on the straight sleeve region, and wherein the second support element is configured to be fastened to a bodywork of the vehicle or an instrument.

11. The connecting sleeve arrangement according to claim 2, further comprising:
a third support element arranged on the first sleeve region, and wherein the third support element is configured to be fastened to an instrument panel of the vehicle, and wherein the first sleeve region comprises a fastening opening configured to fasten the third support element to the first sleeve region.

12. The connecting sleeve arrangement according to claim 11, wherein the third support element comprises a first fastening portion fastened to the connecting sleeve arrangement at the first sleeve region, wherein the third support element comprises a second fastening portion configured to fasten the third support element to the instrument panel of the vehicle, wherein the third support element comprises a connecting portion configured to connect the first fastening portion and the second fastening portion, wherein the second fastening portion, the connecting portion and the first fastening portion are arranged at an angle to one another.

13. The connecting sleeve arrangement according to claim 1, wherein the second receptacle opening is arranged opposite the first receptacle opening offset by a transverse offset from the first cross member direction, wherein the transverse offset is greater than a first outer diameter of the first tubular cross member or wherein the transverse offset is greater than a second outer diameter of the second tubular cross member.

14. The connecting sleeve arrangement according to claim 1, wherein the first half shell comprises a first at least partially arc-shaped cross-section and comprises a first set of two longitudinal edges, and wherein the second half shell comprises a second at least partially arc-shaped cross-section and comprises a second set of two longitudinal edges, wherein, the first set of two longitudinal edges of the first half shell at least partially overlaps the second set of two longitudinal edges of the second half shell, and wherein the first set of two longitudinal edges and the second set of two longitudinal edges are directed toward one another.

15. The connecting sleeve arrangement according to claim 14, wherein at least one of the first or the second half shells comprises a step-shaped form between a longitudinal edge and an arc-shaped portion of the first or the second at least partially arc-shaped cross-section.

16. A cross member arrangement of an instrument panel support, comprising:
a connecting sleeve arrangement comprising a first receptacle opening and a second receptacle opening facing away from the first receptacle opening;
a first tubular cross member extending in a first cross member direction; and
a second tubular cross member extending in a second cross member direction, wherein the first tubular cross member is received in the first receptacle opening of the connecting sleeve arrangement and is connected to the connecting sleeve arrangement, and wherein the second tubular cross member is received in the second receptacle opening of the connecting sleeve arrangement and is connected to the connecting sleeve arrangement.

17. The cross member arrangement according to claim 16, wherein the first and the second tubular cross members are spaced apart from one another within the connecting sleeve arrangement.

18. The cross member arrangement according to claim 16, wherein the first tubular cross member received in the first receptacle opening and the second tubular cross member received in the second receptacle opening are each integrally bonded to an inner wall of the connecting sleeve arrangement.

19. The cross-member arrangement according to claim 18, wherein the first tubular cross member received in the first receptacle opening and the second tubular cross member received in the second receptacle opening are each welded to the inner wall of the connecting sleeve arrangement.

20. The cross member arrangement according to claim 16, wherein the first tubular cross member comprises a different wall thickness, a different tensile strength, or a different outer circumference than the second tubular cross member, wherein the wall thickness, the tensile strength, or the outer circumference of the first tubular cross member is greater than the wall thickness, the tensile strength, or the outer circumference of the second tubular cross member.

* * * * *